Feb. 6, 1951     S. BURES ET AL     2,540,424
APPARATUS FOR SHORT-CIRCUITING OVERHEAD SUPPLY MAINS
FOR ELECTRIC RAILWAYS
Filed Feb. 4, 1948
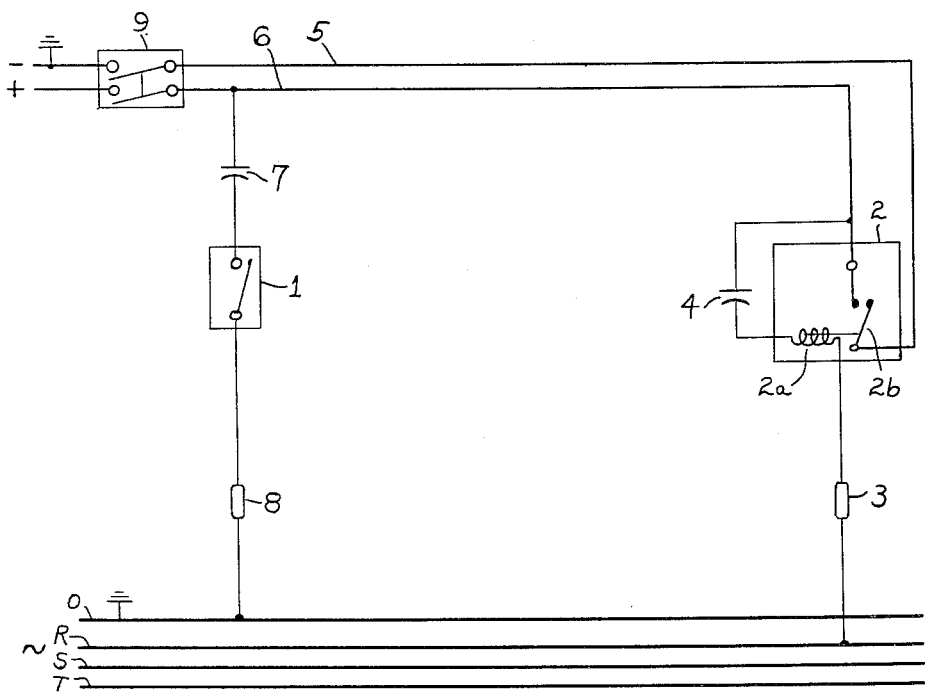
INVENTORS
Stanislav Bureš
František Novák
BY Pierre Scheffler & Parker
ATTORNEYS Patented Feb. 6, 1951

2,540,424

UNITED STATES PATENT OFFICE 2,540,424

APPARATUS FOR SHORT-CIRCUITING OVERHEAD SUPPLY MAINS FOR ELECTRIC RAILWAYS

Stanislav Bureš and František Novák, Zlin, Czechoslovakia, assignors to Bata, Narodni Podnik, Zlin, Czechoslovakia Application February 4, 1948, Serial No. 6,248
In Czechoslovakia February 20, 1947

3 Claims. (Cl. 171—97)

The present invention relates to apparatus for removing hoarfrost from overhead supply mains for electric railways.

The hoarfrost which is formed on overhead supply mains for electric railways in frosty weather, more particularly during the night, when the traffic is interrupted for a relatively long period of time, always leads to complications for the first vehicles or trains to pass on the track after such an interruption. It is broadly known that the hoarfrost may be best removed by heat produced by Joule-effect. For this purpose, in case of railless electrically propelled vehicles, the two overhead conductors are short-circuited and in the case of railways the overhead supply main is connected in short-circuit with the rails. The short-circuiting switches at the ends of the individual sections of the overhead supply main are switched on successively in such a way that only one section is short-circuited at a time, in order to keep the current intensity within the permissible limits. In the described method of removing hoarfrost, the short-circuiting of the sections fed from the source should be effected by one and the same assistant in order to avoid overloading of the current source due to simultaneous short-circuiting of a plurality of sections. This method is tedious since the ends of the individual sections are often removed one from the other a considerable distance, sometimes several miles, and the assistant has to go successively through all the sections.

The apparatus in accordance with the present invention permits remote control of the short-circuiting switches at the sections ends to be effected from a single station, usually from the rectifying station. Thus it becomes unnecessary to walk to the ends of the sections.

The essence of the invention consists in this, that for the remote control of the short-circuiting switches there is made use of an auxiliary alternating electric current and that the two conductors required for feeding the electromagnets of the short-circuiting switches with current are constituted on the one hand by the overhead main and on the other hand by the standard alternating current lighting network, assuming that direct current is employed for short-circuiting. In the case of street railways the alternating current lighting network is always present in the proximity of the end sections. In the rectifying station the presence of the alternating current distributing network is self-evident. Therefore, the utilisation of this network for the purposes of the invention is quite advantageous.

The accompanying drawing shows an example of carrying out the invention and serves to explain the principle of the latter.

On the switch 1 in the control station, for instance in the rectifying station, being switched on, the current circuit for the electromagnet 2a of the short-circuiting switch 2 at the end of the overhead main section is closed. Auxiliary alternating current from the conductor R of the lighting network flows now over the cut-out 3, the winding of the electromagnet 2a in the short-circuiting switch 2 and the condenser 4 to the overhead conductor 6, then over the condenser 7, the switch 1 and the cut-out 8 to the neutral conductor 0, i. e. back to the lighting network, and thereby causes the contacts 2b of the short-circuiting switch 2 to be switched on i. e. closed. The switch 9 connects the short-circuited overhead main 5, 6 to the source of direct current. Short-circuiting direct current begins to pass through the overhead main 5, 6 and the Joule-heat produced by this current unfreezes the hoarfrost enveloping the overhead main. The auxiliary alternating current passes at the same time through the overhead line and retains the contacts 2b of the short-circuiting switch in their closed position. When the hoarfrost has been removed, the switch 1 is opened, thereby disconnecting the magnet coil 2a in the short-circuiting switch from the alternating current lighting network and thus opening the contacts 2b of the short circuiting switch.

The condensers 4 and 7 prevent access of the direct current to the lighting network.

If the overhead main consists of a single conductor, the latter is connected up in a short-circuit with the rails in the same manner. In such a case the reference numeral 5 would denote a rail and the reference numeral 6 the overhead main.

The short-circuiting switch may be closed and opened in unloaded condition by switching it on or off when the switch 9 is open. In such a case the short-circuiting switch is simple, does not require arc extinction and is almost free from disturbances, the maintenance costs being reduced to a minimum.

What we claim is:

1. Apparatus for removing hoarfrost from energized overhead supply mains of electric railways and the like between a main station and a remotely situated station and wherein a power distribution line also extends between the stations, said apparatus comprising, a switch at the remote station for short-circuiting the supply mains to thereby effect heating of the same, an electro-responsive device for actuating said switch, and an energizing circuit for said electro-responsive device, said energizing circuit including means connecting said device between the supply mains and one side of the distribution line at the remote station and means including a control switch at the main station for connecting the supply mains to the other side of the distribution line at the main station.

2. Apparatus for removing hoarfrost from energized direct current overhead supply mains of electric railways and the like between a main station and a remotely situated station and wherein an alternating current power distribution line also extends between the two stations, said apparatus comprising a switch at the remote station for short-circuiting the supply mains to thereby effect heating of the same, an electro-responsive device for actuating said switch, and an energizing circuit for said electro-responsive device, said energizing circuit including means connecting said device between the supply mains and one side of the distribution line at the remote station, means including a control switch at the main station for connecting the supply mains to the other side of the distribution line at the main station, and condensers in each of said connecting means for blocking flow of direct current from said supply mains into said distribution line.

3. Apparatus as defined in claim 2 and which further includes switching means at the main station for disconnecting the supply mains from its source of supply potential to thereby permit operation of said short-circuiting switch under no-load conditions.

STANISLAV BUREŠ.
FRANTIŠEK NOVÁK.

REFERENCES CITED

The following references are of record in the file of this patent:

UNITED STATES PATENTS

| Number | Name | Date |
|---|---|---|
| 503,321 | Hunter | Aug. 15, 1893 |
| 620,654 | Hunter | Mar. 7, 1899 |
| 1,787,500 | Togami | Jan. 6, 1930 |